United States Patent [19]

Haruta et al.

[11] Patent Number: 4,698,324
[45] Date of Patent: Oct. 6, 1987

[54] METHOD FOR MANUFACTURE OF CATALYST COMPOSITE HAVING GOLD OR MIXTURE OF GOLD WITH CATALYTIC METAL OXIDE DEPOSITED ON CARRIER

[75] Inventors: Masatake Haruta, Kawanishi; Hiroshi Sano, Toyonaka; Tetsuhiko Kobayashi, Ikeda, all of Japan

[73] Assignees: Agency of Industrial Science & Technology; Ministry of International Trade & Industry, both of Tokyo, Japan

[21] Appl. No.: 898,945

[22] Filed: Aug. 21, 1986

[51] Int. Cl.[4] .................. B01J 23/52; B01J 23/68; B01J 23/72; B01J 23/74
[52] U.S. Cl. ..................... 502/243; 502/252; 502/317; 502/324; 502/330; 502/340; 502/344; 502/345
[58] Field of Search ............... 502/243, 317, 324, 330, 502/344, 345, 346, 252, 340

[56] References Cited

U.S. PATENT DOCUMENTS 4,215,019  7/1980  Drake et al. .................. 502/330
4,490,481  12/1984  Boitiaux et al. ................ 502/330

FOREIGN PATENT DOCUMENTS 238148  11/1985  Japan.

OTHER PUBLICATIONS

"Preparation of Titania-Supported Catalysts by Ion Exchange, Impregnation and Homogeneous Precipitation", R. Burch and A. R. Flambard, *Scientific Bases for the preparation of Heterogeneous Catalysts, Third International Symposium,* (1982).
"Synthesis of Methanation Catalysts by Deposition–Precipitation", H, Schaper, E. B. M. Doesburg, J. M. C. Quartel and L. L. Van Reijen, *Scientific Bases for the Preparation of Heterogeneous Catalysts, Third International Symposium,* (1982).

*Primary Examiner*—W. J. Shine
*Attorney, Agent, or Firm*—Oblon, Fisher, Spivak, McClelland, & Maier

[57] ABSTRACT

A catalyst composite having gold or a mixture of gold with a catalytic metal oxide deposited on a carrier is produced by immersing a carrier in an aqueous solution containing a water-soluble salt of gold or water-soluble salts respectively of gold and other catalytic metal and urea and/or acetamide thereby allowing a precipitate to be deposited on the carrier and then firing the carrier holding the deposited precipitate thereon.

14 Claims, 1 Drawing Figure

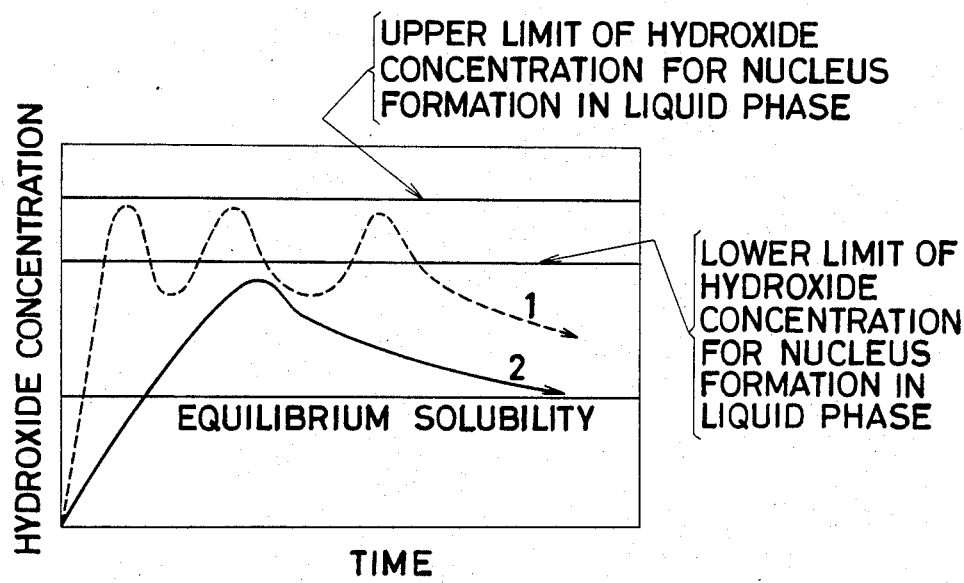

METHOD FOR MANUFACTURE OF CATALYST COMPOSITE HAVING GOLD OR MIXTURE OF GOLD WITH CATALYTIC METAL OXIDE DEPOSITED ON CARRIER

FIELD OF THE INVENTION AND RELATED ART STATEMENT

This invention relates to a method for the production of a catalyst composite having gold or a mixture of gold with other catalytic metal oxide deposited so fast on a carrier as to fulfill satisfactorily the function as a catalyst.

Gold along or a mixture of gold with a catalytic metal oxide is a useful catalyst for reactions of low-temperature combustion. By combining gold with metal oxides in various proportions, catalysts of particular kinds of performance to be desired are produced (Japanese Patent Public Disclosure SHO 60-238148.

These catalysts when produced without a carrier, however, more often than not fail to acquire shapes and strengths desirable from the standpoint of service. Since gold and catalytic metal oxides are expensive, efforts to economize these materials are strongly desired. In the circumstances, it is necessary for these materials to be deposited on carriers which are produced by molding such inorganic refractory substances as alumina and silica in the form of fibers, honeycombs, or granules.

As means of depositing metal oxides on carriers, the following two methods (A, B) are adopted most popularly.

A. Coating and spraying method - The paste of a fine metal oxide powder is applied or sprayed on a carrier and the deposited layer of paste is dried and baked for fast adhesion.

B: Impregnation method - A carrier is impregnated with a metal salt solution, the impregnated carrier is dried and the dried carrier is fired in the air to cause thermal decomposition of the deposited metal salt and consequent deposition of the metal oxide on the carrier.

The following methods are also available for the deposition of metal oxides on carriers.

C. Precipitate deposition method - A carrier is immersed in a metal salt solution and a precipitating agent is added to the solution to induce deposition of a precipitate on the surface of the carrier.

D. Ion adsorption and exchange method - A metallic ion species is deposited by means of adsorption or ion exchange on the surface of a carrier.

E. Vapor-phase deposition method - A metal complex of high vapor pressure is decomposed on a carrier and deposited on the carrier.

Now, these methods will be described below.

In the method A, when a metal oxide is pulverized in a wet mill, for example, the smallest particle diameter obtained is in the neighborhood of 5 $\mu$m. The produced particles show poor adhesiveness to the carrier. The coating formed of these particles on the carrier frequently has a discontinuous texture. In the case of the method B, since the metal salt migrates from the interior of the carrier to the surface of the carrier or into the gaps in the carrier and settles there during the step of drying, clusters of metal oxide particles are formed as separated from the carrier in the catalyst composite to be produced finally. These clusters exhibit poor adhesiveness to the carrier.

The catalyst composites which are produced by the aforementioned methods A and B have a practically fatal drawback in that the metal oxides as catalytically active substances are liable to separate from their carriers. Particularly when metal oxide catalysts are deposited on glass wools or ceramic fibers 1 to 100 $\mu$m in diameter, the catalyst composites produced by the coating method have the disadvantage that since the metal oxide particles merely perch on the cylindrical surfaces of such fibres, they will readily fall off the cylindrical surfaces when the adjacent fibers contact each other. In contrast, the impregnation method not onnly produces a catalytic metal oxide on the individual fibers but also produces it in the interstices between the adjacent fibers and consequently enables the produced metal oxide to join the fibers to one another, with the result that the wooly ceramic fibers possessing elasticity will be solidified by cross-linking and deprived of the elasticity and will burst into pieces on being bent.

In the case of the method D, since the amount of metallic ion species to be deposited by means of adsorption or ion exchange on the ceramic carrier is small, this method is utilized as when such a noble metal as platinum or palladium is to be deposited in an extremely small amount of not more than 0.1% by weight. When the amount of the metal oxide to be deposited is over several percent by weight, however, this method can be applied only with difficulty.

The method E has many problems yet to be solved for the sake of successful commercial application because metal complexes of high vapor pressure are expensive and only metals in a limited group are available for the metal complexes contemplated by this method and further because the devices used for controlling the vapor pressure and the temperature of decomposition and deposition are complicated and expensive.

The method C is generally adopted when the carrier is in the form of powder capable of being suspended in the solution of a metal salt. The catalyst composite, therefore, is obtained in a form having a metal oxide mixed with the carrier powder. This method can hardly produce a catalyst composite having the carrier coated with the metal oxide. Generally, the catalyst composite obtained by this method is subsequently molded in a suitable shape before it is put to use. It is held, therefore, that the precipitate deposition method is unfit for the production of a catalyst composite of a fixed shape having a metal oxide deposited on a carrier. Thus, the desirability of developing a method for easily and inexpensively producing a catalyst composite which has a catalytic metal oxide deposited with ample fastness on a carrier of any desired shape has been finding growing recognition.

OBJECT AND SUMMARY OF THE INVENTION

An object of this invention is to provide a method for easily producing a catalyst composite having gold or a mixture of gold with a catalytic metal oxide, a substance useful as a catalyst, deposited with ample fastness on a carrier of a desired shape.

To be specific, this invention is directed to a method for the manufacture of a catalyst composite having gold alone or a mixture of gold with a catalytic metal oxide deposited on a carrier, which method is characterized by the steps of immersing a carrier in an aqueous solution containing a water-soluble salt of gold or water-soluble salts respectively of gold and catalytic metal, urea, and/or acetamide thereby allowing a composite and/or a precursor thereof to be precipitated and deposited on the surface of the carrier and subsequently firing the carrier having the precipitate deposited thereon.

BRIEF DESCRIPTION OF THE DRAWING

The drawing shows the time-course change of the hydroxide concentration in an aqueous solution in the reaction of homogeneous precipitation.

DETAILED DESCRIPTION OF THE PREFERRED EMBODIMENTS

The method of the present invention is an improvement of the method C described above. Specifically, it is called as "Homogeneous Precipitate Deposition Method". While the conventional method uses sodium hydroxide, sodium carbonate, or aqua ammonia as a precipitant, the present invention uses urea and/or acetamide which is gradually hydrolyzed as a precipitant. Owing to the use of this precipitant, the catalytic substance or the precursor of catalytic substance is precipitated and deposited selectively on the surface of the carrier.

The homogenous precipitate deposition method of the present invention requires a specific set of conditions for each combination of a metal salt and a carrier. As a catalytic metal, chromium, manganese, iron, cobalt, nickel, copper, or gold is used. As a carrier, silica, alumina, or magnesia is used in the form of fibers, granules, honeycombs, or foams.

The precipitant to be used in the homogenous precipitate deposition method is urea and/or acetamide. This precipitant is mixed with a dilute solution of the metal salt. Granules, a shaped piece, or a fibrous mat intended to form a carrier is immersed in the mixed solution and then left aging therein at a suitable temperature. Consequently, the precipitate such as a hydroxide destined to form a catalytic substance or a precursor of catalytic substance is selectively deposited on the surface of the carrier. After completion of the deposition of the precipitate, and resulting composite is washed with water, dried, and fired as generally practiced to obtain a finished catalyst composite.

The precipitant is only required to be capable of producing a neutral or weakly alkaline substance through gradual hydrolysis. Specifically, in this invention, urea and/or acetamide is used. The reactions of hydrolysis proceed as shown below.

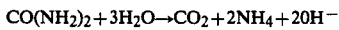
$CO(NH_2)_2 + 3H_2O \rightarrow CO_2 + 2NH_4^+ + 2OH^-$

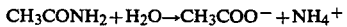
$CH_3CONH_2 + H_2O \rightarrow CH_3COO^- + NH_4^+$

The pH of the aqueous solution can be adjusted to about 9.3 with the formation of ammonium carbonate due to decomposition of urea and to about 7 with the formation of ammonium acetate due to decomposition of acetamide. The conditions of precipitation, therefore, can be adjusted finely by suitably selecting the mixing ratio of the two compounds as precipitants.

The reaction of precipitate deposition effected in the solution by the homogeneous precipitate deposition method proceeds through various paths as shown in FIG. 1, depending on the particular conditions of reaction to be used. Homogeneous formation of nuclei occurs in the liquid phase, for example, when the speed of the hydrolysis of the precipitant is high and when the metal hydroxide concentration in the solution increases abruptly with elapse of time, exceeds the equilibrium solubility of the solid phase of the metal hydroxide, and reaches the critical range of supersaturation degree. As a result, the supersaturation degree falls rapidly.

When the speed of the hydrolysis of the precipitant is high and the concentration of metal hydroxide sharply increases as described above, if the homogeneous formation of nuclei in the liquid phase occurs and the supersaturation degree is consequently lowered temporarily as shown by the curve 1, the concentration again reaches the critical range of supersaturation degree and the formation of nuclei recurs. As a result, precipitate particles of various particle diameters and forms grow in the liquid phase, while deposition of the precipitate on the surface of the carrier occurs only partially or does not occur at all. The carried catalyst composite obtained in this case has extremely low activity and the precipitate particles formed in the liquid phase are discarded. Thus, there ensues the problem of waste of the raw material.

When it is found that the concentration of the metal hydroxide in the solution slowly increases with the elapse of time and the precipitate particles are grown with the surface of the carrier immersed in the liquid phase before the formation of nuclei in the liquid phase takes place as shown by the curve 2, use of these circumstances permits the deposition of the metal hydroxide selectively on the surface of the carrier to be attained as aimed at.

As concerns the reaction of the selective precipitate deposition described above, so long as there is used the aqueous solution of an alkali such as sodium hydroxide which is generally used as a precipitant, local rise of the concentration inevitably occurs at the spots where the solution is added even when the conditions for the addition thereof and the conditions for agitation and mixture are adjusted. As an inevitable consequence, the deposition of precipitate proceeds without selectively.

The conditions such as the concentrations of the water-soluble metal salt, urea, and acetamide, the reaction temperature, and the solution pH which produce the circumstances indicated by the curve 2 in the operation of the method of homogeneous precipitate deposition have been studied. The present invention was perfected as a result of these efforts and permits manufacture of a catalyst composite which has gold and a gold type composite oxide deposited on a carrier with extremely high adhesiveness.

When the catalytic metal to be deposited on the carrier in accordance with the present invention is gold, examples of the water-soluble salt of gold in the aqueous solution include gold(III) chloride acid 4-hydrate, gold(I) potassium cyanide and gold diethylamine trichloride. From the practical point of view, gold(III) chloride acid 4-hydrate proves particularly desirable. In the case of a complex of gold with other catalytic metal oxide, the water-soluble salt of gold is the same as described above and that of other catalytic metal is chromium(III) nitrate 9-hydrate, manganese(II) nitrate 6-hydrate, iron(III) nitrate 9-hydrate, cobalt(II) nitrate 6-hydrate, nickel nitrate(II) 4-hydrate, cooper(II) nitrate 3-hydrate, iron(II) sulfate 7-hydrate, cobalt(II) phosphate 8-hydrate, nickel(II) oxalate 2-hydrate, or nickel(II) acetate 4-hydrate, for example. Among the catalytic metals enumerated above, metal nitrates prove particularly desirable from the practical point of view.

The concentration of the water-soluble salt of catalytic metal in the aqueous solution is required to fall in the range of $5 \times 10^{-3}$ M to $5 \times 10^{-1}$ M. If this concentration is less than the lower limit of the aforementioned range, absolutely no precipitation or only a little precipitation occurs and the catalyst composite obtained possesses an extremely low catalytic activity. If the concentration exceeds the upper limit, the formation of precipitate occurs mainly in the solution and the deposition of precipitate on the surface of the carrier occurs only partially. Preferably this concentration is in the range of $8 \times 10^{-3}$ M to $1 \times 10^{-1}$ M.

The concentrations of urea and acetamide are required each to fall in the range of 1.5 to 20 times the stoichiometric amount required for causing precipitation of metal ions in the aqueous solution. If the concentrations are less than the lower limits of the ranges mentioned above, absolutely no precipitation or only a little precipitation occurs and the catalyst composite obtained possesses an extremely low catalytic activity. If they exceed the upper limits, the formation of precipitate occurs mainly in the solution and the deposition of precipitate on the surface of the carrier occurs only partially. Preferably, the concentrations fall in the range of 3 to 15 times the stoichiometric amount mentioned above. The question as to whether urea is used, acetamide is used, or both are used is decided by the conditions which permit ready precipitation of the hydroxide of a metal other than gold.

The aging of the precipitate is carried out at a temperature in the range of 0° to 100° C. and the firing of the deposited precipitate at the final step is carried out in the air at a temperature in the range of 200° to 1,000° C. The reason for these temperature conditions is that the speed of the hydrolysis of urea or acetamide as a precipitant is allowed to fall in the specified range and, at the same time, the precipitate is allowed to be converted into a composite of gold and a metal oxide.

The carrier to be effectively used in the present invention is not specifically limited. Examples of the carrier desirably used herein include fibers of alumina, particles of alumina, shaped pieces of cordierite, foams of ceramics (cordierites), particles of magnesia, fibers of quartz, and a composite of foamed metal (Ni,Ni-Cr,Cu) having activated alumina carried thereon.

In accordance with the present invention, on a catalyst carrier of any of various shapes, activated gold or a precursor of gold or an activated metal oxide or a precursor thereof can be deposited in a single step with high adhesiveness. As compared with the conventional coating method or impregnation method, the method of this invention has the following advantages.

(1) The procedure is simple and the labor to be required is small as compared with the method which comprises preparing a catalytically active metal oxide, pulverizing the metal oxide, mixing the resulting powder with a binding agent and water, and applying the resulting paste on a catalyst carrier.

(2) The method which comprises immersing a catalyst carrier in the aqueous solution of a catalytic metal salt, evaporating the resulting wet carrier to dryness, and subsequently thermally decomposing the dry deposited precipitate has the possibility that chlorine ion and sulfate ion will persist in the catalytic metal oxide and degrade the activity of the catalyst composite. In contrast, the method of the present invention permits removal of these ions because the precipitate deposited on the carrier can be washed with water subsequently to the deposition.

(3) The deposition of a composite of gold with other catalytic metal on ceramic fibers which the coating method or the impregnation method effects only with difficulty can be materialized by the method of the present invention. Thus, the present invention permits manufacture of a catalyst composite having a satisfactory gas perviousness, possessing a large contact area, and exhibiting flexibility.

(4) As compared with the ion-exchange adsorption method, the method of the present invention enables a far larger amount of a metal oxide to be deposited with high adhesiveness on a catalyst carrier. Thus, the present invention permits manufacture of a catalyst composite of ample activity.

The catalyst composite of the present invention, particularly the catalyst composite having a composite of gold with other catalytic metal oxide deposited on ceramic fibers, causes efficient combustion of a fuel such as hydrogen, carbon monoxide, or propane in a wide range of concentration at a relatively low temperature of not more than 300° C. It can be used, therefore, as a catalyst composite in various space heaters and kitchen heaters of the catalytic combustion type. It can also be utilized as a catalyst composite for cleaning waste gases from kerosene stoves, kerosene fan heaters, and gas fan heaters and as a catalyst filter for cleaning the air being circulated in air conditioners. It is otherwise useful as a catalyst composite for the oxidation of solvent vapor as in the coating material industry or as a catalyst composite for cleaning the waste gases from plants.

The catalytic composite to be produced by the present invention, therefore, has an extremely high economic value.

Now, the present invention will be described more specifically below with reference to working examples.

EXAMPLE 1

In 1,000 ml of an aqueous solution containing 2.1 g of gold(III) chloride acid 4-hydrate and 6.01 g of urea, 6 g of alumina fibers were immersed. This system was placed in a tightly closed sample vial and left standing in a constant temperature bath at 40° C. for 15 hours. Consequently, gold hydroxide was precipitated and deposited on the alumina fibers. The alumina fibers were removed from the aqueous solution and thoroughly washed with water. During the course of the washing with water, the gold hydroxide deposited on the alumina fibers was not separated at all.

Subsequently, the washed alumina fibers were dried at 120° C. for 12 hours and fired under a current of air at 200° C. for 5 hours. Consequently, there was obtained a catalyst composite of gold deposited alumina fibers.

EXAMPLE 2

In 1,000 ml of an aqueous solution containing 0.41 g of gold(III) chloride acid 4-hydrate and 0.27 g of acetamide, 10 g of activated alumina particles 3 mm in particle diameter were immersed. This system was placed in a tightly closed sample vial and left standing in a constant temperature bath at 70° C. for 10 hours. Consequently, gold hydroxide was precipitated and deposited on the activated alumina particles. The alumina particles were removed from the aqueous solution and thoroughly washed with water. During the course of the washing with water, the gold hydroxide deposited on the activated alumina particles was not separated at all.

Subsequently, the activated alumina particles were dried at 120° C. for 12 hours and fired under a current of air at 500° C. for 5 hours. Consequently, there was obtained a catalyst composite of gold deposited alumina particles.

EXAMPLE 3

A honeycomb of cordierite (100×100×30 mm, 238 g) was immersed in 1,000 ml of an aqueous solution containing 4.12 g of gold(III) chloride acid 4-hydrate, 36 g of chromium(III) nitrate 9-hydrate, and 36 g of urea. This system was placed in a lidded petri dish and left standing in a constant temperature bath at 80° C. for 5 hours. Consequently, a composite of gold hydroxide with chromium oxide was precipitated and deposited on the honeycomb. This honeycomb was removed from the aqueous solution and thoroughly washed with water. During the course of the washing with water, the composite precipitate of gold hydroxide and chromium oxide deposited on the honeycomb was not separated at all.

Then, the washed honeycomb was dried at 120° C. for 12 hours and fired under a current of air at 400° C. for 5 hours. Consequently, there was obtained a catalyst composite of honeycomb having a composite of gold and chromium oxide deposited thereon.

EXAMPLE 4

In 1,000 ml of an aqueous solution containing 2.07 g of gold(III) chloride acid 4-hydrate, 1.43 g of manganese(II) nitrate 6-hydrate, and 6 g of urea, 6 g of alumina fibers were immersed. This system was placed in a tightly closed sample vial and left standing in a constant temperature bath at 100° C. for 5 hours. Consequently, a composite of gold hydroxide with manganese oxide was precipitated and deposited on the alumina fibers. The alumina fibers were removed from the aqueous solution and thoroughly washed with water. During the course of the washing with water, the composite precipitate of gold hydroxide and manganese oxide deposited on the alumina fibers was not separated at all.

Subsequently, the washed alumina fibers were dried at 120° C. for 12 hours and fired under a current of air at 400° C. for 5 hours. Consequently, there was obtained a catalyst composite of alumina fibers having the composite of gold and manganese oxide deposited thereon.

EXAMPLE 5

A ceramic foam (150×150×15 mm, 120 g) was immersed in 1,000 ml of an aqueous solution containing 2.07 g of gold(III) chloride acid 4-hydrate, 18.2 g of iron(III) nitrate 9-hydrate, 60 g of urea, and 53 g of acetamide. This sytem was placed in a lidded petri dish and left standing in a constant temperature bath at 30° C. for 5 hours. Consequently, a composite of gold hydroxide with iron hydroxide was precipitated and deposited on the ceramic foam. This ceramic foam was removed from the aqueous solution and thoroughly washed with water. During the course of the washing with water, the composite of gold hydroxide and iron hydroxide deposited on the ceramic foam was not separated at all.

Subsequently, the washed ceramic foam was dried at 120° C. for 12 hours and fired under a current of air at 600° C. for 5 hours. Consequently, there was obtained a catalyst composite of ceramic foam having the composite of gold and iron oxide deposited thereon.

EXAMPLE 6

In 1,000 ml of an aqueous solution containing 1.04 g of gold(III) chloride acid 4-hydrate, 13.8 g of cobalt(II) nitrate 6-hydrate, and 5.86 g of urea, 6 g of alumina fibers were immersed. This system was placed in a sample vial and left standing in a constant temperature bath at 80° C. for 5 hours. Consequently, a composite of gold hydroxide with cobalt hydroxide was precipitated and deposited on the alumina fibers. The alumina fibers were removed from the aqueous solution and washed thoroughly with water. During the course of the washing with water, the composite precipitate of gold hydroxide and cobalt hydroxide deposited on the alumina fibers was not separated at all.

Subsequently, the washed alumina fibers were dried at 120° C. for 12 hours and fired under a current of air at 800° C. for 5 hours. Consequently, there was obtained a catalyst composite having the composite of gold and cobalt oxide deposited thereon.

EXAMPLE 7

In 1,000 ml of an aqueous solution containing 2.05 g of gold(III) chloride acid 4-hydrate, 11.2 g of nickel(II) acetate 4-hydrate, and 42.8 g of urea, 80 g of magnesia particles having a particle diameter of 5 mm were immersed. This system was placed in a tightly closed sample vial and left standing in a constant temperature bath at 30° C. for 5 hours. Consequently, a composite of gold hydroxide with nickel hydroxide was precipitated and deposited on the magnesia particles. The magnesia particles were removed from the aqueous solution and thoroughly washed with water. During the course of the washing with water, the composite precipitate of gold hydroxide and nickel hydroxide deposited on the magnesia particles was not separated at all.

Subsequently, the washed magnesia particles were dried at 120° C. for 12 hours and fired under a current of air at 1,000° C. for 5 hours. Consequently, there was obtained a catalyst composite of magnesia particles having the composite of gold and nickel oxide deposited thereon.

EXAMPLE 8

In 1,000 ml of an aqueous solution containing 0.53 g of gold(III) chloride acid 4-hydrate, 1.1 g of cooper(II) nitrate 3-hydrate, and 5.8 g of urea, 5 g of quartz fibers were immersed. This system was placed in a tightly closed sample vial and left standing in a constant temperature bath at 80° C. for 15 hours. Consequently, a composite of gold hydroxide with copper hydroxide was precipitated and deposited on the quartz fibers. The quartz fibers were removed from the aqueous solution and thoroughly washed with water. During the course of the washing with water, the composite precipitate of gold hydroxide and copper hydroxide deposited on the quartz fibers was not separated at all.

Subsequently, the washed quartz fibers were dried at 120° C. for 12 hours and fired under a current of air at 400° C. for 5 hours. Consequently, there was obtained a catalyst composite of quartz fibers having the composite of gold and copper oxide deposited thereon.

EXAMPLE 9

An activated alumina carrier held on a ceramic foam (150×150×30 mm, 238 g ) was immersed in 1,000 ml of an aqueous solution containing 6.8 g of gold(III) chloride acid 4-hydrate, 4.8 g of manganese(II) nitrate 6- hydrate, 39 g of cobalt(II) nitrate 6-hydrate, and 21 g of urea. This system was placed in a lidded petri dish and left standing in a constant temperature bath at 80° C. for 5 hours. Consequently, a composite of gold hydroxide, manganese hydroxide, and cobalt hydroxide was precipitated and deposited on the activated alumina carrier held on the ceramic foam. The activated alumina carrier held on the ceramic foam was removed from the aqueous solution and washed with water. During the course of the washing with water, the composite precipitate of gold hydroxide, manganese hydroxide, and cobalt hydroxide deposited on the ceramic foam was not separated at all.

Subsequently, the washed ceramic foam was dried at 120° C. for 12 hours and fired under a current of air at 400° C. for 5 hours. Consequently, there was obtained a catalyst composite of the activated alumina carrier held on the ceramic foam having the composite of gold, manganese oxide, and cobalt oxide deposited thereon.

EXAMPLE 10

An activated alumina carrier held on a metal foam (150×150×10 mm, 95 g) was immersed in an aqueous solution containing 2.06 g of gold(III) chloride acid 4-hydrate, 5.74 g of manganese(II) nitrate 6-hydrate, 29.1 g of cobalt(II) nitrate 6-hydrate, and 42.8 g of urea. This system was placed in a lidded petri dish and left standing in a constant temperature bath at 80° C. for 5 hours. Consequently, a composite of gold hydroxide, manganese hydroxide, and cobalt hydroxide was precipitated and deposited on the activated alumina carrier held on the metal foam. The activated alumina carrier held on the metal foam was removed from the aqueous solution and washed with water. During the course of the washing with water, the composite precipitate of gold hydroxide, manganese hydroxide, and cobalt hydroxide deposited on the metal foam was not separated at all.

Subsequently, the washed metal foam was dried at 120° C. for 12 hours and fired under a current of air at 400° C. for 5 hours. Consequently, there was obtained a catalyst composite of the activated alumina carrier held on the metal foam having the composite precipitate of gold, manganese oxide, and cobalt oxide deposited thereon.

EXAMPLE 11

In 1,000 ml of an aqueous solution containing 5.09 g of gold(III) chloride acid 4-hydrate, 14 g of manganese(II) nitrate 6-hydrate, 73 g of cobalt(II) nitrate 6-hydrate, and 42.8 g of urea, 6 g of alumina fibers were immersed. This system was placed in a tightly closed sample vial and left standing in a constant temperature bath at 80° C. for 5 hours. Consequently, a composite of gold hydroxide, manganese hydroxide, and cobalt hydroxide was precipitated and deposited on the alumina fibers. The alumina fibers were removed from the aqueous solution and washed with water. During the course of the washing with water, the composite precipitate of gold hydroxide, manganese hydroxide, and cobalt hydroxide deposited on the alumina fibers was not separated at all.

Subsequently, the washed alumina fibers were dried at 120° C. for 12 hours and fired under a current of air at 400° C. for 5 hours. Consequently, there was obtained 6.90 g of a catalyst composite of alumina fibers having the composite precipitate of gold, manganese oxide, and cobalt oxide deposited thereon.

The catalyst composite was placed in a sieve of 40 mesh and shaken therein for 30 minutes. After the shaking, the catalyst composite was weighted to find the change in weight. The composite precipitate was deposited to cover the entire surface of the fibers and was separated very little from the surface by the shaking. The weight of the catalyst composite which was 6.90 g before the shaking decreased to 6.85 g in consequence of the shaking. Since the composite phase was not formed between the individual fibers, the alumina fibers retained their inherent properties intact and remained in a soft wooly state.

Now, comparative experiments will be set out below.

COMPARATIVE EXPERIMENT 1

In 1,000 ml of an aqueous solution containing 5.1 g of gold(III) chloride acid 4-hydrate, 14 g of manganese(II) nitrate 6-hydrate, and 73 g of cobalt(II) nitrate 6-hydrate, 6 g of alumina fibers were immersed. This system was evacuated to a vacuum for about 1 hour for the purpose of degasification and then left standing overnight. Then, the alumina fibers were removed from the aqueous solution, dried under a vacuum for 10 hours, and then fired under a current of air at 400° C. for 5 hours. Consequently, there was obtained 8.5 g of a catalyst composite of alumina fibers having the composite of gold, manganese oxide and cobalt oxide deposited thereon.

This catalyst composite was tested for weight change by following the procedure of Example 11.

Separate oxide particles were formed between the individual fibers to keep the fibers in a mutually fused state. The aggregate of the fibers failed to assume any woolly state and remained in a stiff state. This catalyst composite first weighed 8.5 g. The weight taken 30 minutes after the shaking in a sieve was only 6.8 g. The fibers gave rise to short broken fragments.

COMPARATIVE EXPERIMENT 2

Into an aqueous solution containing 32.5 g of sodium carbonate and 12.5 g of potassium permanganate, 1,000 ml of an aqueous solution containing 5.1 g of gold(III) chloride acid 4-hydrate, 14 g of manganese(II) nitrate 6-hydrate, and 73 g of cobalt(II) nitrate 6-hydrate was added while under agitation. The agitation was continued for two hours after completion of the addition. The precipitate consequently formed was thoroughly washed by repeating decantation several times and then separated by filtration.

The separated precipitate was dried at 120° C. for 12 hours and fired under a current of air at 400° C. for 5 hours. Consequently, there was obtained a catalyst composite of gold, manganese oxide, and cobalt oxide. The composite thus obtained was finely pulverized overnight in a wet mill. The fine powder consequently obtained was mixed with 2% by weight of polyvinyl alcohol (polymerization degree 500) to produce a sludgy paste. The paste was sprayed on glass fibers with a spray gun. The wet glass fibers were dried overnight in a draught and then fired at 400° C. for 5 hours. Consequently, there was obtained 10.0 g of a catalyst composite of glass fibers having a composite of gold, manganese oxide, and cobalt oxide (atomic ratio of 80:16:4) deposited thereon.

The catalyst composite was tested for weight change by following the procedure of Example 11. In this case, since the composite as the catalyst was simply perched on the fibers. In consequence of 5 minutes' shaking, the weight of the catalyst composite which was initially 10.0 g decreased to 9.1 g, proving that the composite was readily separated from the fibers. In this case, the composite could not cover the entire surface of the fibers even when the spraying was repeated again and again. Thus, the catalyst composite obtained showed poor catalytic activity.

When the catalyst composites obtained in Examples 1-10 were tested for weight change by following the procedure of Example 11, they showed very little weight change and remained virtually intact.

What is claimed is:

1. A method for manufacturing a catalyst composite having gold deposited on a carrier, which comprises:
  (a) immersing a carrier in an aqueous solution of a mixture consisting of a water-soluble salt of gold and at least one member selected from the group consisting of urea and acetamide, thereby causing precipitation of gold or a precursor of gold or a combination thereof, and deposition thereof on the surface of the carrier; and
  (b) firing said carrier having said precipitate deposited thereon, and wherein the concentration of said water-soluble salt of gold in said aqueous solution is in the range of $5 \times 10^{-3}$M to $5 \times 10^{-1}$M and the concentrations of urea and acetamide therein are each in the range of 1.5 to 20 times the stoichiometric amount required for causing precipitation of metallic ions in said aqueous solution.

2. The method according to claim 1, wherein said water-soluble salt of gold is at least one member selected from the group consisting of gold(III) chloride acid 4-hydrate, gold(I) potassium cyanide and gold diethylamine trichloride.

3. The method according to claim 1, wherein said precipitate is aged by keeping the temperature of the aqueous solution for immersion of the carrier in the range of 0° C. to 100° C.

4. The method according to claim 1, wherein said firing is carried out at a temperature in the range of 200° to 1,000° C.

5. A method for manufacturing a catalyst composite having a composite of gold and a catalytic metal oxide deposited on a carrier, which comprises:
  (a) immersing a carrier in an aqueous solution of a mixture consisting of water-soluble salts of gold and a catalytic metal and at least one member selected from the group consisting of urea and acetamide, thereby causing precipitation of said composite or a precursor thereof or both, and deposition thereof on the surface of the carrier; and
  (b) firing said carrier having said precipitate deposited on the surface thereof and wherein the concentration of said water-soluble salt in said aqueous solution is in the range of $5 \times 10^{-3}$M to $5 \times 10^{-1}$M and the concentration of urea and acetamide therein are each in the range of 1.5 to 20 times the stoichiometric amount required for causing precipitation of metallic ions in said aqueous solution.

6. The method according to claim 5, wherein said water-soluble salt of gold is at least one member selected from the group consisting of gold(III) chloride acid 4-hydrate, gold(I) potassium cyanide and gold diethylamine trichloride.

7. The method according to claim 5, wherein said catalytic metal oxide is at least one member selected from the group consisting of oxides of chromium, manganese, iron, cobalt, nickel, and copper.

8. The method according to claim 5, wherein said precipitate is aged by keeping the temperature of the aqueous solution for immersion of the carrier in the range of 0° C. to 100° C.

9. The method according to claim 5, wherein said firing is carried out at a temperature in the range of 200° to 1,000° C.

10. The method according to claim 1, wherein said carrier is selected from the group consisting of fibers of alumina, particles of alumina, shaped pieces of cordierite, foams of cordierite ceramics, particles of magnesia, fibers of quartz and a composite of foamed metal having activated alumina carried thereon.

11. The method according the claim 2, wherein said water-soluble salt of gold is gold (III) chloride acid 4-hydrate.

12. The method according to claim 5, wherein said carrier is selected from the group consisting of fibers of alumina, particles of alumina, shaped pieces of cordierite, foams of cordierite ceramics, particles of magnesia, fibers of quartz and the composite of foamed metal having activated alumina carried thereon.

13. The method according to claim 6, wherein said water-soluble salt of gold is gold (III) chloride acid 4-hydrate.

14. The method according to claim 7, wherein the water-soluble salt of the catalytic metal is selected from the group consisting of chromium (III) nitrate 9-hydrate, manganese (II) nitrate 6-hydrate, iron (III) nitrate 9-hydrate, cobalt (II) nitrate 6-hydrate, nickel nitrate (II) 4-hydrate, copper (II) nitrate 3-hydrate, iron (II) sulfate 7-hydrate, cobalt (II) phosphate 8-hydrate, nickel (II) oxalate 2-hydrate and nickel (II) acetate 4-hydrate.

* * * * *

UNITED STATES PATENT AND TRADEMARK OFFICE
CERTIFICATE OF CORRECTION

PATENT NO. : 4,698,324

DATED : October 6, 1987

INVENTOR(S) : Masatake Haruta, et al

It is certified that error appears in the above-identified patent and that said Letters Patent is hereby corrected as shown below:

On the Title Page:

The priority information is not printed on the Letters Patent.
Should read as follows:

- August 30, 1985  [JP] Japan ........ 60-192775

Signed and Sealed this

Ninth Day of February, 1988

Attest:

DONALD J. QUIGG

Attesting Officer

Commissioner of Patents and Trademarks